(No Model.)
J. N. PRINGLE.
AXLE LUBRICATOR.
No. 434,358. Patented Aug. 12, 1890.
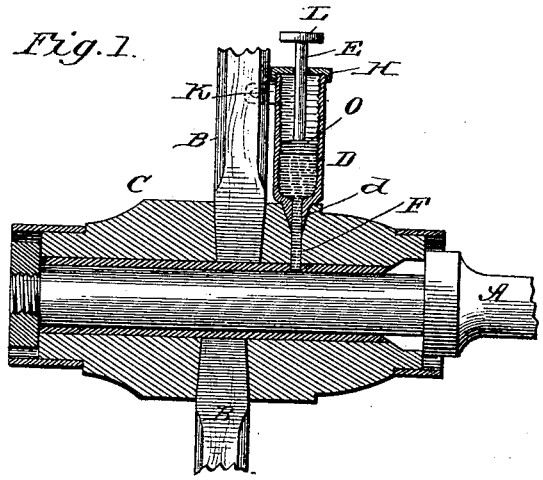
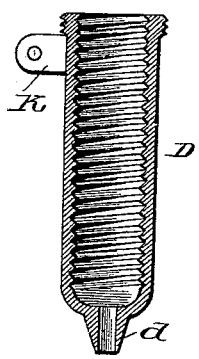
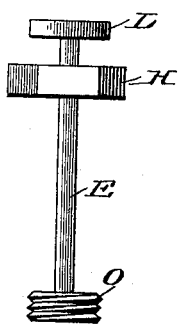
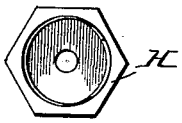
WITNESSES:
Fred G. Dieterich
P. B. Turpin
INVENTOR:
John N. Pringle
BY Munn & Co.
ATTORNEYS

UNITED STATES PATENT OFFICE.

JOHN NELSON PRINGLE, OF BELLEVILLE, ONTARIO, CANADA.

AXLE-LUBRICATOR.

SPECIFICATION forming part of Letters Patent No. 434,358, dated August 12, 1890.

Application filed March 11, 1890. Serial No. 343,460. (No model.)

*To all whom it may concern:*

Be it known that I, JOHN NELSON PRINGLE, of Belleville, Ontario, Canada, have invented a new and useful Improvement in Axle-Lubricators, of which the following is a specification.

My invention is an improvement in lubricators for the axles of vehicle-wheels; and the invention consists in certain novel constructions and combinations of parts, as will be hereinafter described, and pointed out in the claims.

In the drawings, Figure 1 is a sectional view of the invention. Fig. 2 is a sectional detail view of the lubricator-cup. Fig. 3 is a detail side view of the presser-head and its shaft and handle and the cap-piece, and Fig. 4 is a detail view of the cap-piece.

The axle A, spokes B, and hub C may, in general respects, be of ordinary construction. Through the hub C is formed an opening F, leading radially into the bore or bearing for the spindle. This opening F may be either a plain bored hole or may be cased with a smooth or threaded tube or casing. The lubricator D is formed with a body part open at its upper end, screw-threaded internally, and provided at its lower end with a nipple d, adapted to and fitted snugly in the opening F in the hub.

The lubricator-body is secured in place by means of a lug K, extended therefrom and perforated for the passage of a nail therethrough and into the spoke or hub. In the construction shown the lug K laps alongside of and is secured to one of the spokes; but manifestly it may be arranged to lap against and be secured to the hub, so that such lug may be referred to generally as lapping against and secured to a portion of the wheel, and specifically as arranged at the outer end of the lubricator-body and lapped against and secured to one of the wheel-spokes. The presser-head O is secured on the lower end of shaft E, and is threaded to fit the interior of the lubricator-body, the shaft E extending up through a cap H, threaded on the open end of the body and having at its upper end a handle L. By turning shaft E it will be seen that the presser-head O may be adjusted down in the body to force the tallow, axle-grease, or other lubricant out onto the axle-spindle, or may be adjusted up out of such body to permit the refilling thereof with lubricant, as may be desired or necessary.

The turning of the wheel will distribute the lubricant properly to the different portions of the spindles, keeping them thoroughly greased.

Having thus described my invention, what I claim as new is—

1. The combination of the wheel having its hub provided with an opening F, the lubricator-body having its nipple or discharge communicating with the said opening, having its interior screw-threaded, and provided with a lug or ear lapped against and secured to a part of the wheel, the cap or top threaded on said body and having a central opening, and the screw-presser threaded within the lubricator-body and having its stem extended up through the cap or top and provided with a handle by which it may be turned, all substantially as and for the purpose set forth.

2. The combination of the wheel having its hub provided with an opening F, the lubricator-body having its upper end open, its interior screw-threaded, and provided at its lower end with a nipple entering the opening F of the wheel-hub, a lug or ear extended from said lubricator-body and secured to the wheel-spoke, the screw-threaded presser-head, the shaft and handle therefor, and removable top or cap, all substantially as and for the purposes set forth.

JOHN NELSON PRINGLE.

Witnesses:
J. W. BUTTERFIELD,
F. DAVY DIAMOND.